US011445655B2

(12) United States Patent
Madarasi et al.

(10) Patent No.: US 11,445,655 B2
(45) Date of Patent: Sep. 20, 2022

(54) CUTTING UNIT FOR AN AGRICULTURAL WORKING MACHINE, AND METHOD FOR ADJUSTING A CUTTING UNIT

(71) Applicant: CLAAS Hungária Kft., Törökszentmiklós (HU)

(72) Inventors: Gergely Madarasi, Szoinok (HU); Támas Denke, Budapest (HU); Támas Megyeri, Abony (HU); Györy Zoltan Lörincz, Szoinok (HU); Christian Füchtling, Rinkerode (DE); Andreas Rieping, Rinkerode (DE); Andras Pazsik, Békéscsaba (HU)

(73) Assignee: CLAAS Hungária Kft., Törökszentmiklós (HU)

( * ) Notice: Subject to any disclaimer, the term of this patent is extended or adjusted under 35 U.S.C. 154(b) by 672 days.

(21) Appl. No.: 16/502,205

(22) Filed: Jul. 3, 2019

(65) Prior Publication Data
US 2020/0008341 A1  Jan. 9, 2020

(30) Foreign Application Priority Data

Jul. 4, 2018 (DE) .......................... 102018116213.8
Jul. 4, 2018 (DE) .......................... 102018116232.4

(51) Int. Cl.
*B25J 5/00* (2006.01)
*A01B 73/00* (2006.01)
*B25J 5/06* (2006.01)

(52) U.S. Cl.
CPC ............. *A01B 73/005* (2013.01); *B25J 5/007* (2013.01); *B25J 5/06* (2013.01)

(58) Field of Classification Search
CPC ........... A01B 73/005; B25J 5/007; B25J 5/06; A01D 75/002
See application file for complete search history.

(56) References Cited

U.S. PATENT DOCUMENTS

| 5,243,810 A | 9/1993 | Fox et al. |
| 10,760,247 B2* | 9/2020 | Carpenter ................. E02F 9/26 |
| 2018/0084724 A1 | 3/2018 | Fuchtling |

FOREIGN PATENT DOCUMENTS

EP   3298879 A1   3/2018

* cited by examiner

*Primary Examiner* — Ian Jen
(74) *Attorney, Agent, or Firm* — Lempia Summerfield Katz LLC

(57) ABSTRACT

A cutting unit for an agricultural working machine and a method for adjusting the cutting unit are disclosed. The cutting unit comprises a support body, a cutting device on the support body, a front suspension arranged on the support body on a first half of the cutting unit and has at least one wheel that rotates about a front axle and a rear suspension on the support body on a second half of the cutting unit and has at least two wheels that rotate about a rear axle, the front suspension and the rear suspension being rotatable about a respective rotary axis relative to the support body so that the front and rear suspensions can each be transferred between a transport position and a working position. The front suspension and the rear suspension, when in their respective working position, are moved relative to the support body between a high position and a low position.

21 Claims, 14 Drawing Sheets

CUTTING UNIT FOR AN AGRICULTURAL WORKING MACHINE, AND METHOD FOR ADJUSTING A CUTTING UNIT

CROSS REFERENCE TO RELATED APPLICATIONS

This application claims priority under 35 U.S.C. § 119 to German Patent Application No. DE 102018116232.4 (filed Jul. 4, 2018) and to German Patent Application No. DE 102018116213.8 (filed Jul. 4, 2018), the entire disclosure of both of which are hereby incorporated by reference herein.

TECHNICAL FIELD

The technical field relates to an arrangement comprising an agricultural working machine and more particularly relates to a cutting unit for an agricultural working machine and a method for adjusting and for operating a cutting unit.

BACKGROUND

A cutting unit comprises a supporting body on which an elongated cutting device is arranged. The cutting device may comprise a cutter bar by which plants to be harvested, such as corn plants, can be cut. Typically, the cutting unit has a reel through which plants to be harvested may be fed to the cutting device. Such a cutting unit may particularly be designed as a so-called "draper cutting unit" that has two conveyor belts aligned transverse to the driving direction of the working machine. One conveyor belt each is assigned to a respective one-half of the cutting unit, wherein the conveyor belts work in opposite directions so that they are configured to convey cut plants toward a middle region of the cutting unit from where the plants, for example, may be transferred to a downstream inclined conveyor. Such a cutting unit can for example be found in European patent application EP 3 298 879 A1 (see also US Patent Application Publication No. 2018/0084724 A1, incorporated by reference herein in its entirety).

The cutting unit also has a front suspension and a rear suspension that are each assigned to one half of the cutting unit at a distance from each other. In this case, the front suspension is located in a first portion, such as a first half (e.g., the front half) of the cutting unit, whereas the rear suspension is assigned to a second portion, such as a second half (e.g., the rear half). The assignment to the "front" and "rear" depends on the orientation of the cutting unit while it is being transported, wherein "front" is the front viewed in the driving direction of the cutting unit, and "rear" is the rear viewed in the driving direction of the cutting unit. Both the front suspension as well as the rear suspension each interact with at least one wheel through which the cutting unit can be transported in public road traffic. Accordingly, the cutting unit is drivable to the extent that the front suspension and the rear suspension are each in a transport position. In this transport position, the front suspension and the rear suspension, or the assigned front axle or rear axle, and are aligned transverse to a longitudinal axis of the cutting unit. The wheels of the front suspension and the rear suspension are arranged so as to be rotatable about the front axle or rear axle so that the cutting unit can roll on the wheels in a direction parallel to the longitudinal axis of the cutting unit. In particular, the cutting unit may be suspended using a tow bar on a tractor, which is one example of the agricultural working machine itself, so that the agricultural working machine together with the cutting unit may use the public road in public road traffic. When the front suspension and rear suspension are in the respective transport position, the cutting unit generally can be placed entirely or independently on the ground underneath by the wheels of the front and rear suspension so that the entire dead weight of the cutting unit is borne via the wheels by the ground underneath.

The front suspension and the rear suspension can be transferred into or transitioned to a working position in which the front suspension and the rear suspension, or the front axle or rear axle assigned to them, are aligned parallel to the longitudinal axis of the cutting unit. In the working position, the cutting unit is also suitable to be moved in a direction transverse to its longitudinal axis on the ground underneath. Correspondingly, the cutting unit is then suitable for cutting plants while the agricultural working machine is operating, and making them accessible for further processing. The rotary axes about which the front suspension and rear suspension can rotate are oriented perpendicular to the longitudinal axis of the cutting unit and are, as a rule, preferably oriented vertically, and more preferably arranged in the middle of the front or rear suspension. This facilitates rotating the front and rear suspension from the transport position into the working position or vice versa, wherein, in particular, manual rotation may be performed very easily and hence quickly. When the front suspension and rear suspension are in the working position, the front and rear axle are arranged parallel to the longitudinal axis of the cutting unit.

Another example cutting unit is disclosed U.S. Pat. No. 5,243,810. U.S. Pat. No. 5,243,810 discloses a cutting unit that has a front suspension with a front wheel and a rear suspension with two rear wheels, wherein the front suspension and the rear suspension can each be transferred from or transitioned to a working position into a transport position so that the cutting unit can be moved on public roads without transport on a trailer being necessary.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
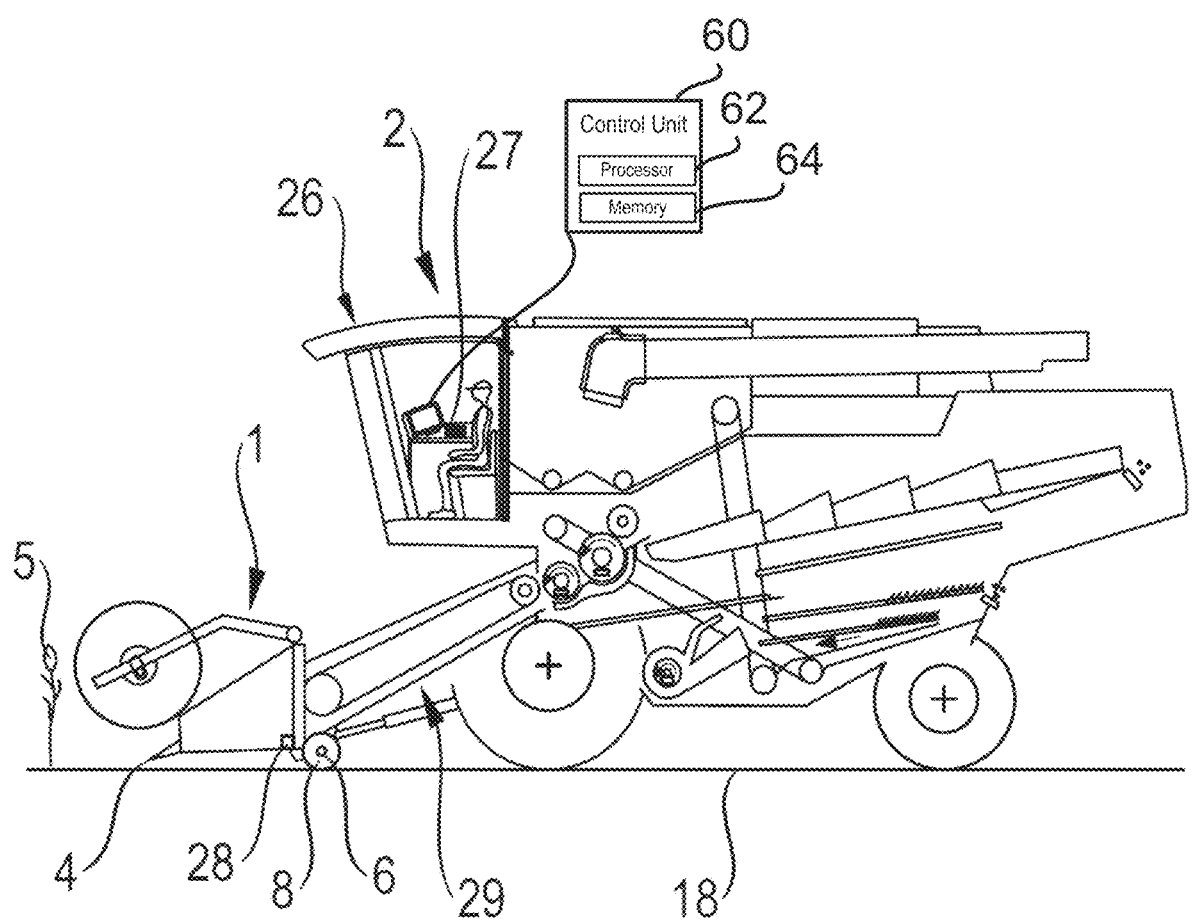
FIG. 1 illustrates an agricultural working machine that is equipped with a cutting unit.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, U.S. Pat. No. 5,243,810 discloses a cutting unit. The front and rear suspension in U.S. Pat. No. 5,243,810 discloses a cutting unit are transferred from the working position into the transport position by a manually executed combined swinging movement initially about a horizontal axis, and thereafter a vertical one.

This cutting unit has may be difficult to operate since the steering system, when in its working position, can hinder the cutting unit from functioning in an optimal manner for the respective harvesting conditions. Specifically, a fixed working height of the cutting device relative to ground underneath is established by the cutting unit.

In contrast, a cutting unit and a method are disclosed with enhanced adaptability to different harvesting parameters in order to improve harvesting results according to one or more boundary conditions (including existing boundary conditions).

Thus, in one implementation, a cutting unit for an agricultural working machine (such as a combine) is disclosed. The cutting unit includes: a support body; at least one elongated cutting device arranged or positioned on the support body through which the plants may be harvested; a front suspension arranged or positioned on the support body that is assigned to the first half of the cutting unit and has at least one wheel configured to rotate about a front axle; a rear suspension arranged or positioned on the support body that is assigned to the second half of the cutting unit and has at least two wheels configured to rotate about a rear axle. The cutting unit is further configured: wherein both the front suspension and the rear suspension are designed or configured to be rotatable about a respective rotary axis relative to the support body so that the front suspension and the rear suspension are each configured to be transferred or transitioned between a transport position and a working position; wherein the front suspension and the rear suspension, when in their respective transport position, are aligned transverse to a longitudinal axis of the cutting unit, and when in their respective working position, are aligned parallel to the longitudinal axis of the cutting unit; and wherein the front suspension and the rear suspension, when in their respective working position, are configured to be moved between a high position and a low position using at least one adjusting device relative to the support body.

In one implementation, the wheels of the cutting unit are arranged or positioned entirely above a floor level of the cutting unit when the front suspension and the rear suspension are in their respective high position so that the cutting unit may be placed on the ground below without the effect of the wheels (e.g., without the wheels of the front suspension and the rear suspension bearing any load).

Further, the wheels may at least partially extend below a floor level of the cutting unit when the front suspension and rear suspension are in their respective low position so that the cutting unit may be placed on ground below by the wheels while lowering the cutting unit. In one implementation, the front suspension and the rear suspension may each interact with an adjusting device respectively assigned to them.

In one or more implementations, the front suspension and/or the rear suspension interact with a transmission element, wherein the transmission element is pivotably or rotatably arranged about a pivot axis or a rotary axis on the support body so that the front suspension and/or the rear suspension, when in their respective working position, can move between the high position and the low position by pivoting the transmission element. In one or more implementations, the adjusting device comprises one or both of the device to generate the motive force to move between the high position and the low position and/or the electronics to interact with (e.g., send data to and/or receive data from) electronics (e.g., the input device and/or the control unit) on the agricultural work machine. As one example, the adjusting device comprises a hydraulic system that preferably is formed by a hydraulic cylinder.

In one or more implementations, the rear suspension has a limiter, such as a limiter, such as a limiting means, by which, when the rear suspension is in its working position, an oscillating rotary movement of the rear suspension relative to the support body may be limited about an axis of oscillation within an oscillation range to either side of a zero position of the rear suspension.

In one or more implementations, at least one stopper, such as a stopping means, is arranged or positioned on or connected to the support body that, when the limiter is in its active position, corresponds therewith such that the limiter strikes the stopper when a maximum pendulum swing of the rear suspension is reached, so that a further oscillating rotary movement of the rear suspension is blocked.

In one or more implementations, the limiter and/or the stopper interact with at least one damper, such as at least one damping means, through which a striking of the limiter against the stopper can be dampened.

In one or more implementations, at least one blocker, such as at least one blocking means, through which the front suspension and/or the rear suspension may be temporarily connected at least indirectly in a form fit with the support body so that a movement of the front suspension or the rear suspension relative to the support body is blocked, particularly when the front suspension and/or the rear suspension is in its high position.

In one or more implementations, a lowering of the front suspension and/or the rear suspension may be limited using a blocker, whereby the front suspension and/or rear suspension are in their respective low position upon striking the blocker.

In one or more implementations, the rotary axis for rotating the front suspension and/or the rotary axis for rotating the rear suspension are configured vertically and in the middle of the front suspension or the rear suspension in order to transfer between their transport position and their working position, and whereby the front suspension and/or the rear suspension may be transferred or transitioned between the transport position and working position only by rotating about the respective vertical rotary axis assigned to them. In one or more implementations, each respective rotary axis is oriented orthogonal to a longitudinal axis of the cutting unit.

In one or more implementations, the at least one adjusting device is connected or positioned in a manner so as to transmit data to an input device arranged or positioned in a driver's cab of the agricultural working machine so that a movement of the front suspension in its working position and/or the rear suspension in its working position may be controlled or effectuated by operating the input device (e.g., inputting a command).

In this regard, movement of the front suspension and/or the rear suspension between the high position and low position may be effectuated smoothly. Consequently, the front and rear suspension need not merely assume two discrete positions (i.e., the high position and the low position). Instead, the front suspension and the rear suspension may be positioned in any number of intermediate positions (such as a plurality of discrete intermediate positions). In one implementation, the height at which the cutting unit with its cutting device should be guided above ground underneath can thereby be determined. This may be based on the consideration that the cutting unit can be placed on the ground underneath with the wheels of the front suspension and the rear suspension when in the working position, whereby the cutting unit (and the cutting device with it) is arranged at a specific distance in height from the ground underneath. By moving the front suspension and the rear suspension, this height may be adjusted according to the operator. In particular, the operator may choose between the high position and the low position depending on the harvested material and/or the harvesting conditions. The selection by the operator may be made from the driver's cab (e.g., via the input device), such as while in the operation of harvesting. In this regard, in one implementation, the high position and/or the low position may be automatically adjusted using the adjusting device according to the selection by the operator. Various types of adjusting devices are contemplated. As one example, the adjusting device may comprise a hydraulically operated piston/cylinder unit. As another example, the adjusting device may comprise a linear motor.

In one or more implementations, the cutting unit may be connected to or arranged or positioned on a support element, such as a feeder housing of the agricultural working machine. In this way, the cutting height of the cutting unit may be adjusted by an adjustment of the support element, such as with the assistance of a support element adjusting device.

Advantageously, the cutting unit may be designed such that the wheels, when the front suspension and the rear suspension are arranged in their respective high position, are arranged or positioned relative to the support body such that the wheels assigned to the front suspension and the rear suspension are each located completely above the floor level of the cutting unit. In other words, no part of the wheels thus lies below a level in height of the floor level of the cutting unit. Consequently, when the cutting unit is completely lowered, it can be placed directly on the ground underneath with its support body without the wheels coming into contact with the ground underneath. In this setting, the height of the cutting unit is more or less equal to zero so that the cutting device functions at a lowest possible level in height, or at a lowest possible working height above the ground underneath. In this position, the plants to be harvested may be cut at a lowest possible position.

Moreover, such a design is particularly advantageous when the wheels at least partially extend entirely below the floor level of the cutting unit when the front suspension and rear suspension are in their respective low position. As noted above, the cutting unit therefore cannot be placed directly on the ground underneath with its support body since, when the cutting unit is lowered, the wheels first come into contact with the ground underneath, and the cutting unit is thus borne at a certain height above the ground underneath. The low position is typically the position at which the front suspension and the rear suspension are dropped down in harvesting mode so that the wheels are at least partially arranged or positioned above the ground level. By moving the front suspension and the rear suspension between the high position and the low position, the working height of the cutting device may then be adjusted or readjusted as desired between the described levels. Operating the cutting unit with the wheels contacting the ground has the advantage that the wheels can dampen and thus prevent a swinging up of the cutting unit when the terrain is particularly uneven. In this case, movement of the cutting unit may be dampened using the hydraulic system of the wheels, such as by using a pressure limiting valve.

Further, the cutting unit may be lifted using the agricultural working machine such that the wheels do not come into contact with the ground underneath when the front suspension and the rear suspension are in their respective low position, and the cutting unit thus completely "floats" above the ground underneath.

Further, the front suspension and the rear suspension each may cooperate with an independent adjusting device. Independent of this design, but which may be in combination with the same, the adjusting device may cooperate with a hydraulic system. Various adjusting devices are contemplated. As one example, the adjusting device may comprise a piston/cylinder unit. As one example, the adjusting device may comprise a linear motor. Further, other suitable designs for the adjusting device are contemplated. The design of the adjusting device, including or in combination with a hydraulic system, enables a large force to be exerted on the front suspension and the rear suspension. The adjusting device enables the raising or lowering of the cutting unit. This is in particular relevant when the front suspension and the rear suspension, when in their working position, are in a position in which their wheels at least partially extend below the floor level of the cutting unit, and the cutting unit therefore stands on ground underneath by means of the wheels. It is moreover contemplated to hold or maintain the cutting unit at the adjusted level of height after a performed adjustment thereof so that the adjustment of a desired working height of the cutting device can be maintained throughout the entire harvesting process.

In the one or more implementations in which the cutting height of the cutting unit is adjusted by adjusting the support element (such as the feeder housing) of the agricultural working machine, only a slight weight, in particular approximately 150-250 kg are exerted on the ground in the low position by the front suspension and/or the rear suspension. The cutting unit is then borne by the support element. In this embodiment, the wheels in the working position therefore do not serve to bear the weight of the cutting unit in the high position or in the low position.

In one or more implementations, the front suspension and/or the rear suspension interact with a transmission element. The transmission element serves to transmit force between the front suspension or the low suspension and the support body of the cutting unit. To accomplish this, the transmission element is pivotably arranged about a pivot axle on the support body so that the front suspension or the rear suspension, at least when in their working position, can move relative to the support body between their high position and low position by pivoting the transmission element. The transmission element may be composed of steel.

In another implementation, the front suspension and the rear suspension are at least partly constructed differently from each other such that a span of the rear suspension significantly exceeds that of the front suspension. Various differences are contemplated. As one example, one difference may be manifested in that the wheels of the rear suspension that oppose each other and lie to the extreme outside are spaced further from each other than correspondingly arranged wheels of the front suspension. In this case, it is contemplated to design the front suspension with only a single wheel. With regard to the rear suspension, it is furthermore advantageous when it has precisely two wheels. Should the front suspension be designed with more than one wheel, the wheels on the front suspension may be arranged directly adjacent to each other, such as at a distance of less than 50 cm from each other.

With regard to the rear suspension with an arrangement of each of the assigned wheels at a significant distance from each other, in particular at a distance between the wheels of more than 1.5 m, these wheels can stand or roll on different levels in height on the ground underneath. It is for example contemplated for a wheel of the rear suspension located to the outside on the right in the driving direction of the cutting unit to travel over a bump projecting in height above the ground underneath, whereas the wheel located to the left on the outside travels through a dip lower in height than the other level of height of the ground underneath. As a result, this causes the rear suspension to be angled and skewed relative to the support body. First off, it may be advantageous if the rear suspension is mounted on the support body such that it can execute such an "oscillating rotary motion" about an axis of oscillation relative to the support body such that any unevenness in the ground underneath is not transmitted directly to the support body. Consequently, the support body per se may be driven smoothly and free of continuous changing loads even with uneven ground underneath.

In order to also prevent a collision of the rear suspension with the support body of the cutting unit, the rear suspension may include at least one limiter, such as a limiter, by which the oscillating rotary movement of the rear suspension can be limited relative to the support body, at least when the rear suspension is in its working position. The limiter may be designed or configured such that it limits the described oscillating rotary movement of the rear suspension on both sides starting from a home position. The home position in this case describes the position of the rear suspension in which the rear axle about which the wheels of the rear suspension rotate is arranged at least substantially horizontally. An oscillating rotation angle of the rear suspension relative to the support body of the cutting unit is zero in the home position. The limiter is advantageously designed such that it limits the oscillating rotary movement on both sides starting from the home position such that the amount of the oscillating rotation angle can assume a maximum of 15° (e.g., no greater than 15°), more particularly a maximum of 12.5° (e.g., no greater than 12°), and even more particularly a maximum of 10° (e.g., no greater than 10°).

In one or more implementations, the limiter may be transferred or transitioned between an active position and a passive position so that the limiter may be intentionally activated when the rear suspension is in its working position. In the working position, the cutting unit may be operated when the limiter is activated. In this regard, in one implementation, the condition predicate to operating the cutting unit in its working position is to activate the limiter.

The support body may be provided with at least one stopper that interacts with the limiter when the limiter is in an active position. This interaction is such that the limiter strikes the stopper when the rear suspension reaches a maximum oscillating rotation angle, whereby a further oscillating rotary movement of the rear suspension relative to the support body is blocked. By a corresponding adjustment of the stopper, it is possible to adjust to the above-described range of the oscillating rotation angle.

Moreover, in one or more implementations, the limiter and/or the stopper may interact with at least one damper. This damper has the advantage that a striking of the limiter against the stopper may be dampened so that excessive material stress can be prevented.

To further configure the cutting unit, in one or more implementations, the cutting unit comprises at least one blocker by which the front suspension and/or the rear suspension can be at least indirectly connected in a form fit with the support body. In particular, the blocker can be designed to be nondestructively releasable from the remaining cutting unit so that it can be activated or deactivated as desired. The blocker causes a movement, such as a pivoting of the front suspension or the rear suspension relative to the support body to be blocked. This relates in particular to the situation in which the respective suspension is located in its working position. The blocking of the movement of the front suspension or the rear suspension relative to the support body may, in particular, be used in a variety of instances, such as when the cutting unit is placed on the ground underneath or a trailer and no further appropriate use of the cutting unit is pending, at least for the moment, or if an adjustment of the cutting unit between the high position and low position is undesired. To the extent that the front suspension and/or the rear suspension are located in such a position that their wheels do not extend to the bottom of the plane of the floor of the cutting unit, the pivoting of both the front suspension and/or rear suspension can be blocked using the blocker.

To establish the low position of the front and/or rear suspension, the cutting unit may be equipped with at least one blocker for the front suspension and/or the rear suspension. This blocker can in particular provide a mechanical blockage that mechanically blocks the downward pivoting of the front suspension or the rear suspension relative to the support body beyond a certain extent. The downward position blocked by the blocker of the front and rear suspension then forms the respective low position. Between the high position and the low position, the front and rear suspension can advantageously assume any desired intermediate position. Various types of blockers are contemplated. As one example, the blocker may be formed by a bolt. The bolt may, for example, interact with corresponding recesses in the support body of the cutting unit, wherein mechanical blockage of the front suspension or the rear suspension is provided by inserting a bolt in a corresponding recess.

In an advantageous design, the cutting unit may be configured such that the rotary axis for rotating the front suspension and/or the rotary axis for rotating the rear suspension are configured vertically and in the middle of the front suspension or the rear suspension in order to transfer between their transport position and their working position. One design according to this implementation may comprise when only one of the rotary axes of the front suspension or the rear suspension is configured in the described manner. Alternatively, both rotary axes of the front suspension and rear suspension may have the described features. In this regard, the cutting unit may be configured such that one or both of the rotary axes for respectively rotating the front suspension and/or the rear suspension are configured vertically and in the middle of the front suspension or the rear suspension in order to transfer between their transport position and their working position.

The cutting unit may comprise a Draper cutting unit. In this implementation, the cutting unit has at least two conveyor belts that work in opposite directions of conveyance to transport cut harvested material through which the harvested material can be conveyed to an inclined conveyor of a working machine.

In one implementation, a self-propelling agricultural working machine may include such a cutting unit. The self-propelling agricultural working machine may comprise a combine or forage harvester. The cutting unit may be releasably secured to an inclined conveyor of the self-propelling agricultural working machine. In this situation, the inclined conveyor may be arranged in the middle of the cutting unit.

With regard to a complete agricultural working machine that is equipped with a cutting unit, the at least one adjusting device of the cutting unit may be connected indirectly, for example via a control, in a manner so as to transmit data to an input device arranged in a driver's cab of the working machine. In this way, operating the input device in the driver's cab causes a movement of the front suspension and/or rear suspension in their working position. In particular, it is contemplated for an operator of the agricultural working machine to control as desired the at least one adjusting device for example by a touch interface or a joystick which changes the working height of the cutting device.

It is further contemplated for the working machine to be provided with a control unit that is operatively connected to the at least one adjusting device. The control unit can be suitable for actuating the adjusting device independently, e.g., without a special entry by the operator and thereby automatically set the working height of the cutting device. In this case, it is particularly contemplated for the working machine to be equipped with a sensor device that detects at least one harvesting parameter, for example the type or quality of the plants to be harvested, and/or a relief of the ground underneath. The detected data may then be provided to the control unit that automatically controls (via one or more commands) adapting the working height of the cutting device according to an instruction and thereby improves harvesting.

In one or more implementations, the operator may select, via an input device, between the high position and the low position. The control unit may then send a command, via a communication interface (e.g., a wire or communication bus on the cutting unit) to lower and/or lift cutting unit depending on a cutting height. The position of the wheels may therefore be adjusted depending on the cutting height both in the high position as well as in the low position. The cutting height may also be adjustable by the operator of the agricultural working machine that bears or is connected to the cutting unit. The high position and low position as well as the preselection of the cutting height may be selected from the driver's cab in one embodiment.

A method for adjusting a cutting unit of an agricultural working machine is disclosed as well. The method includes moving, using at least one adjusting device, a front suspension and/or a rear suspension of a cutting unit between a high position and a low position relative to a support body of the cutting unit when in their respective working position in which they are aligned parallel to a longitudinal axis of the cutting unit. The method moreover includes that the front suspension and/or the rear suspension are only rotated about a vertical rotary axis that is also configured or positioned in the middle of the front suspension or rear suspension relative to a support body of the cutting unit to transfer between the transport position and the working position.

In one or more implementations, the movement of the front suspension and/or the rear suspension is controlled by way of an input device from a driver's cab of the agricultural working machine.

In one or more implementations, the front suspension and the rear suspension are rotated about their respective rotary axes assigned to them relative to the support body.

In one or more implementations, a front axle assigned to the front suspension or the rear axle assigned to the rear suspension is rotated within a horizontal plane while the front suspension and/or the rear suspension is rotating about the respective rotary axis assigned to them.

In one or more implementations, the front suspension and/or the rear suspension are rotated by an angular dimension of 90° about the associated respective rotary axis while transferring between the transport position and the working position.

In one or more implementations, the front suspension and/or the rear suspension are fixed in their working position through at least one securing element so that unintentional rotation of the front suspension or the rear suspension about the associated respective rotary axis is blocked or prevented.

In this regard, a working height of the cutting device may be adjusted to a desired extent using the at least one adjusting device and thereby optimizing the cutting unit for different harvesting conditions. The adjusting device may be operated such that the front suspension and the rear suspension are arranged or positioned relative to the support body when in their high position such that the wheels of the front suspension and the rear suspension are completely above a floor level of the cutting unit. In this configuration, the cutting unit may be placed on the ground underneath with direct contact therewith, or be guided on the ground underneath in direct contact therewith.

Further, a working height of the cutting device is minimal in this adjustment. Contrastingly, the wheels of the front suspension and the rear suspension may extend at least partially below the floor level when they are in their respective low position so that the cutting unit can be placed on the ground underneath by means of the wheels. In particular, the cutting unit can be guided on the ground underneath under the effect of the wheels such that an undesired upswing of the cutting unit in the presence of uneven ground conditions can be reduced or even completely avoided that may otherwise occur. Advantageously, the front suspension and the rear suspension can be adjusted in any number of intermediate positions between the high position and the low position.

As discussed above, the movement of the front suspension and/or the rear suspension may be controlled using an input device that is arranged in the driver's cab of the agricultural working machine. In this manner, the working height of the cutting device or the height of the cutting unit relative to the ground below can be easily adjusted from the driver's cab.

Moreover, in one or more implementations, the movement of the front suspension and/or rear suspension may be performed automatically, wherein the at least one adjusting device is controlled by means of a control unit. The control unit may, in particular, communicate with at least one sensor device, with the sensor device generated data indicative of at least one harvesting parameter. The control unit may then process the data in order to determine a working height of the cutting device based on the data. As one example, the control unit may include one or more data constructs which correlates the data indicative of the at least one harvesting parameter and the respective height of the cutting device. In this regard, responsive to the control unit receiving specific data from the sensor, the control unit may determine the specific height of the cutting device that is correlated to the specific data, and may command one or more devices to adjust the cutting unit to the specific height. For example, the control unit may send a command to control the least one adjusting device in order for the at least one adjusting device to adjust the working height of the cutting device to that specified by the control unit. It is, for example, contemplated that the control unit, based on the sensor data, may identify the presence of particularly uneven ground conditions, and accordingly automatically lift (via control of the adjusting device) the working height of the cutting device. In this way, the control unit may actuate the adjusting device so that the front suspension and the rear suspension are moved toward their low position which increases the height of the cutting unit relative to the ground underneath and likewise the working height of the cutting device.

In one or more implementations of the method, both the front suspension as well as the rear suspension may each be rotated about an independent rotary axis relative to the support body. The above-described advantages result with this procedure both for the front suspension as well as for the rear suspension.

Moreover, such a method is advantageous in which the front suspension and/or the rear suspension are rotated by an angular dimension of 90° about the associated rotary axis while transferring between the transport position and the working position. This rotation allows for the respective suspension, when in its transport position, to be arranged "in the driving direction" of the cutting unit, i.e., the suspension per se is oriented transverse to the longitudinal axis of the cutting unit. When in the working position, the front suspension or the rear suspension are contrastingly oriented such that they are aligned parallel with the longitudinal axis of the cutting unit, wherein the described rotation of 90° may be performed due to the vertical rotary axis. In this manner, when the front suspension and the rear suspension are in their respective transport position, it is possible to move the cutting unit in a driving direction that is oriented at least substantially parallel to the longitudinal axis of the cutting unit, whereas the cutting unit can be moved in a driving direction that is oriented perpendicular to the longitudinal axis of the cutting unit when the front and rear suspension are in their respective working position.

The method may then furthermore be advantageous when the front suspension and/or the rear suspension are fixed in their working position at least indirectly on the support body using at least one securing element, for example a safety bolt. In this way, it prevents the front suspension or the rear suspension from executing an unintentional rotation about the rotary axis assigned to it. Said rotation is contrastingly blocked using the securing element.

Referring to the figures, an exemplary implementation shown in FIGS. 1-14 comprises a cutting unit 1, which includes a support body 3 and a cutting device 4. The cutting unit 1 is configured in the shown example to interact with an agricultural working machine 2 in the form of a combine. The agricultural working machine 2 that interacts with a cutting unit 1 is schematically portrayed in FIG. 1. In this case, the cutting unit 1 is formed by a so-called Draper cutting unit that has two conveyor belts (not shown in the figures) that are transverse to a driving direction of the agricultural working machine 2. One conveyor belt each is assigned to one-half 7, 10 of the cutting unit 1 (illustrated in FIG. 2), wherein the conveyor belts work in opposite directions so that they are suitable to convey cut plants 5 toward a middle region of the cutting unit 1 from where the plants 5 can be transferred to a downstream inclined conveyor 29.

Figure 2:
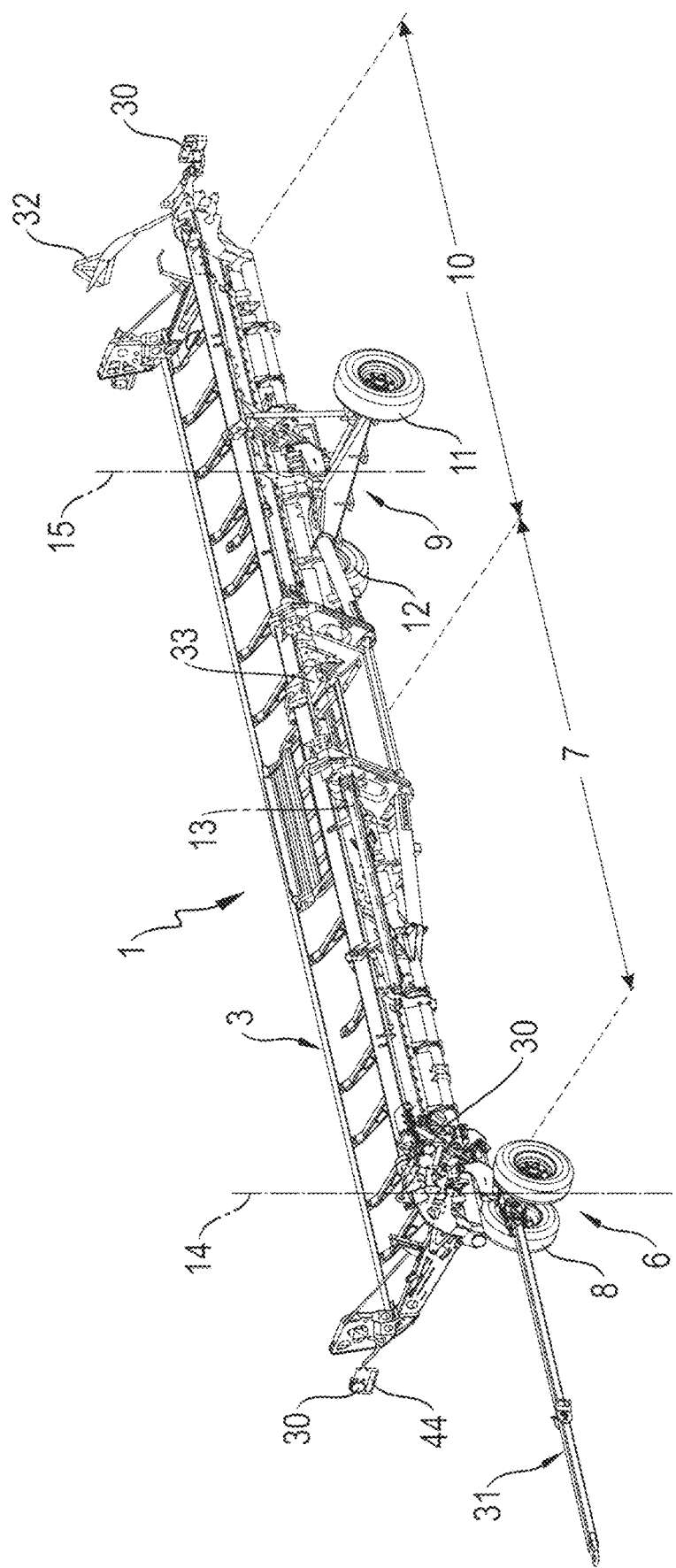
FIG. 2 illustrates a perspective representation of a cutting unit.

In this case, the cutting unit 1 is formed by a cutter bar with two blade rows that are movable relative to each other. By moving the first blade row relative to the second, fixed blade row, a cutting effect is produced by which the plants 5 to be harvested, formed by wheat in this case, can be cut. The cutter bar is connected to the inclined conveyor 29 of the agricultural working machine 2 in the shown example through which cut plants 5 can be conveyed toward other working units of the agricultural working machine 2. To transfer the cut plants 5 to the inclined conveyor 29, the cutting unit 1 has a rear opening cross-section 33 through which the plants 5 can be conveyed toward the inclined conveyor 29. The opening cross-section 33 is illustrated in FIG. 2. The agricultural working machine 2 also has a driver's cab 26 from which an operator monitors and controls the agricultural working machine 2. At least one input device 27 is arranged in the driver's cab 26 through which the operator may input one or more commands. One example of the input device 27 comprises an I/O interface, such as a touchscreen, a keyboard, or the like.

The agricultural working machine 2 may further include a control unit 60. In one implementation, control unit 60 is integrated with input device 27. Alternatively, control unit 60 is separate from input device 27. Control unit 60 may comprise any type of computing functionality and may include processor 62 and memory 64.

Control unit 60 may be configured to process data and store data, respectively. For example, as discussed above, control unit may be operatively connected, such as in electronic communication with, the at least one adjusting device. In one implementation, the control unit 60 may receive the input from the operator via input device 27 and transmit one or more commands to the at least one adjusting device in order to position the cutting unit 1 as described herein. Alternatively, or in addition, the control unit 60 may receive data, such as from sensor device that detects at least one harvest parameter, in order to automatically control the at least one adjusting device in order to position the cutting unit 1 as described herein.

Though processor 62 (which may comprise a microprocessor, controller, PLA or the like) and memory 64 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The cutting unit 1 has a front suspension 6 and a rear suspension 9 by which the cutting unit 1 may be transported, such as in public road traffic. The front suspension 6 is assigned to a first half 7 of the cutting unit 1, whereas the rear suspension 9 is assigned to a second half 10. In the shown example, the front suspension 6 is arranged in a front end section of the cutting unit 1. The rear suspension 9 is contrastingly located at least approximately centrally in the second half 10 of the cutting unit 1.

The front suspension 6 in the shown example has two wheels 8 that are arranged at a distance of approximately 50 cm from each other (e.g., no more than 60 cm from each other). The rear suspension 9 also has two wheels 11, 12 that are arranged at a distance of approximately 1.70 m from each other (e.g., no less than 1.5 m from each other). To transport the cutting unit 1, the front suspension 6 and the rear suspension 9 are each be in their transport position. This transport position is readily discernible in FIG. 2. When in the transport position, the front suspension 6 and the rear suspension 9 are arranged at least substantially transverse to the longitudinal axis 13 of the cutting unit 1. Depending on the nature of ground underneath 18 on which the cutting unit 1 stands, at least one front axle 36 around which the wheels 8 of the front suspension 6 can rotate, as well as one rear axle 25 around which the wheels 11, 12 of the rear suspension 9 can rotate are oriented at least substantially horizontal. In the shown example, the front suspension 6 interacts directly with a tow bar 31 through which the overall cutting unit 1 can be connected to a tractor. In particular, it is possible to connect the tow bar 31 to the agricultural working machine 2 so that another working machine is unnecessary to transport the cutting unit 1 on the road.

Figure 3:
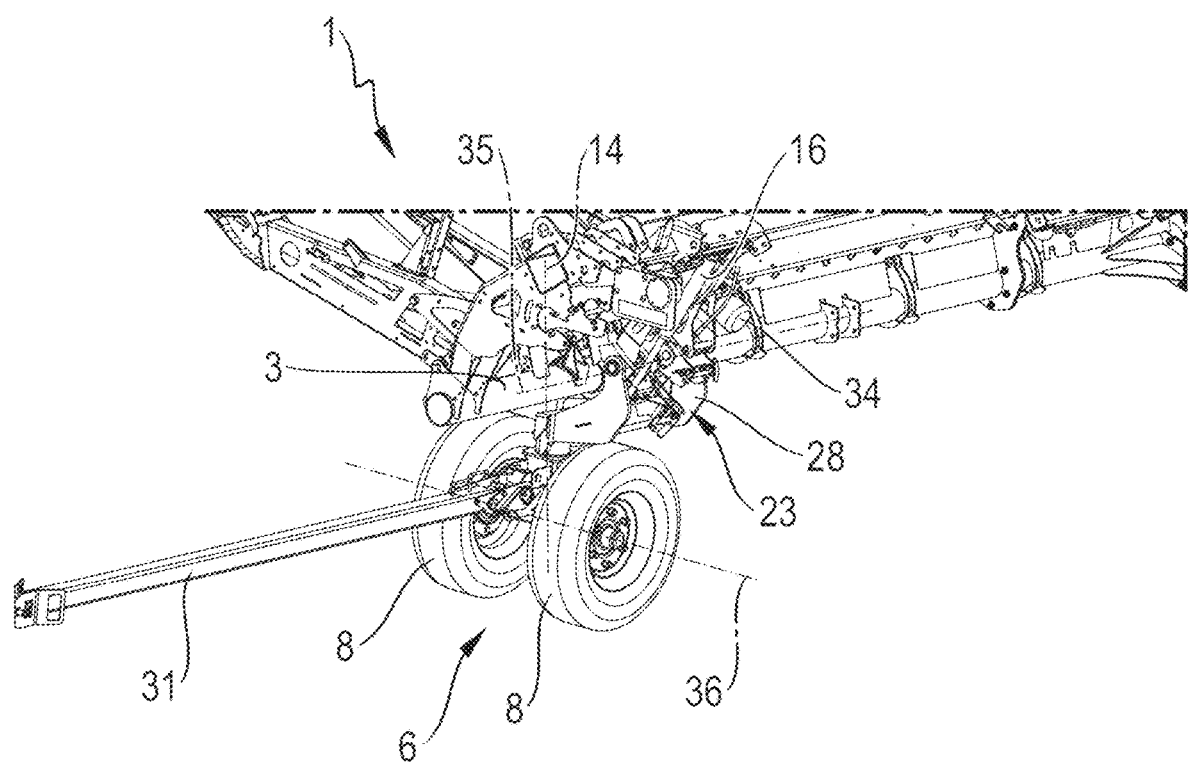
FIG. 3 illustrates a detail of a front suspension of the cutting unit according to FIG. 2, wherein the front suspension is in its transport position.
Figure 4:
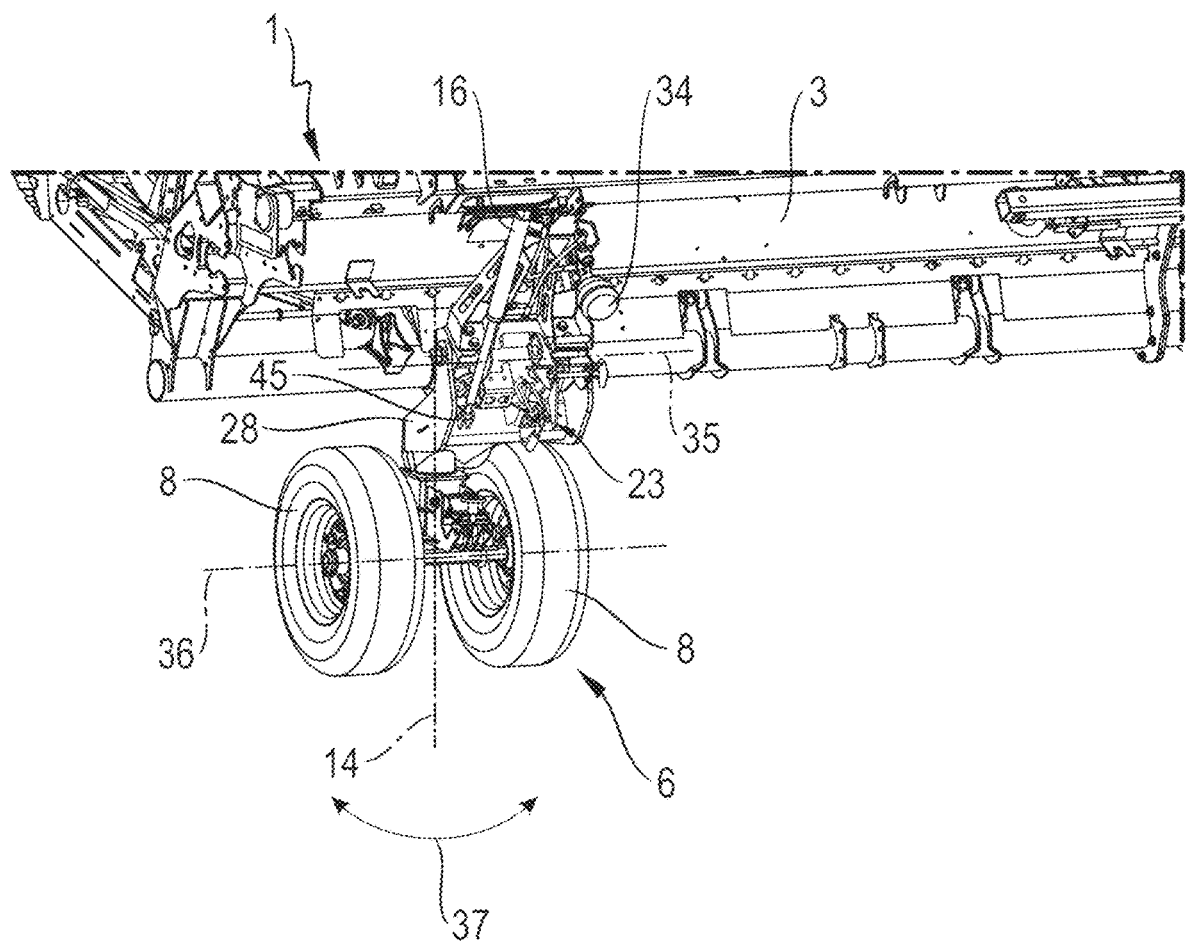
FIG. 4 illustrates the detail of the front suspension according to FIG. 3, wherein the front suspension is in an intermediate position.

A detail of the front suspension 6 in its transport position is shown in FIG. 3. In the shown exemplary implementation, the front suspension 6 is connected to the support body 3 of the cutting unit 1 through a transmission element 28. The front suspension 6 can be rotated about a rotary axis 14 relative to the transmission element 28, and consequently relative to the support body 3. To do this, it has a rotary shaft (not shown) that extends in the direction of the rotary axis 14, and about which the transmission element 28 is rotatably fastened. The rotary axis 14 in this case is oriented perpendicular to the front axle 36 and vertically so that, by rotating the front suspension 6 relative to the transmission element 28, the front axle 36 is rotated within an at least substantially horizontal plane. Moreover, the rotary axis 14 is arranged centrally relative to the front suspension 6 so that the wheels 8, during a rotation thereof, of the front suspension 6 circulate about the rotary axis 14 on a common circular path around a midpoint that is part of the rotary axis 14. Because of the design of the rotary axis 14, the front axle 36 moves within an at least substantially horizontal plane while the front suspension 6 is being transferred or transitioned between the transport and working position.

To suppress an undesired rotation of the front suspension 6 about the rotary axis 14, the front suspension 6 is connected in a form fit to the transmission element 28 by using a securing element 50, such as a safety bolt. Other securing elements are contemplated. To transfer the front suspension 6 from its transport position to its work position, the safety bolt is removed so that the front suspension 6 can rotate freely about the rotary axis 14. The rotatability is specifically shown in FIG. 4 and with the double arrow 37 portrayed therein. To transfer into the work position, the front suspension 6 is rotated about an angle of 90° starting from its transport position. Then, the front suspension 6 is in an intermediate position.

Figure 14:
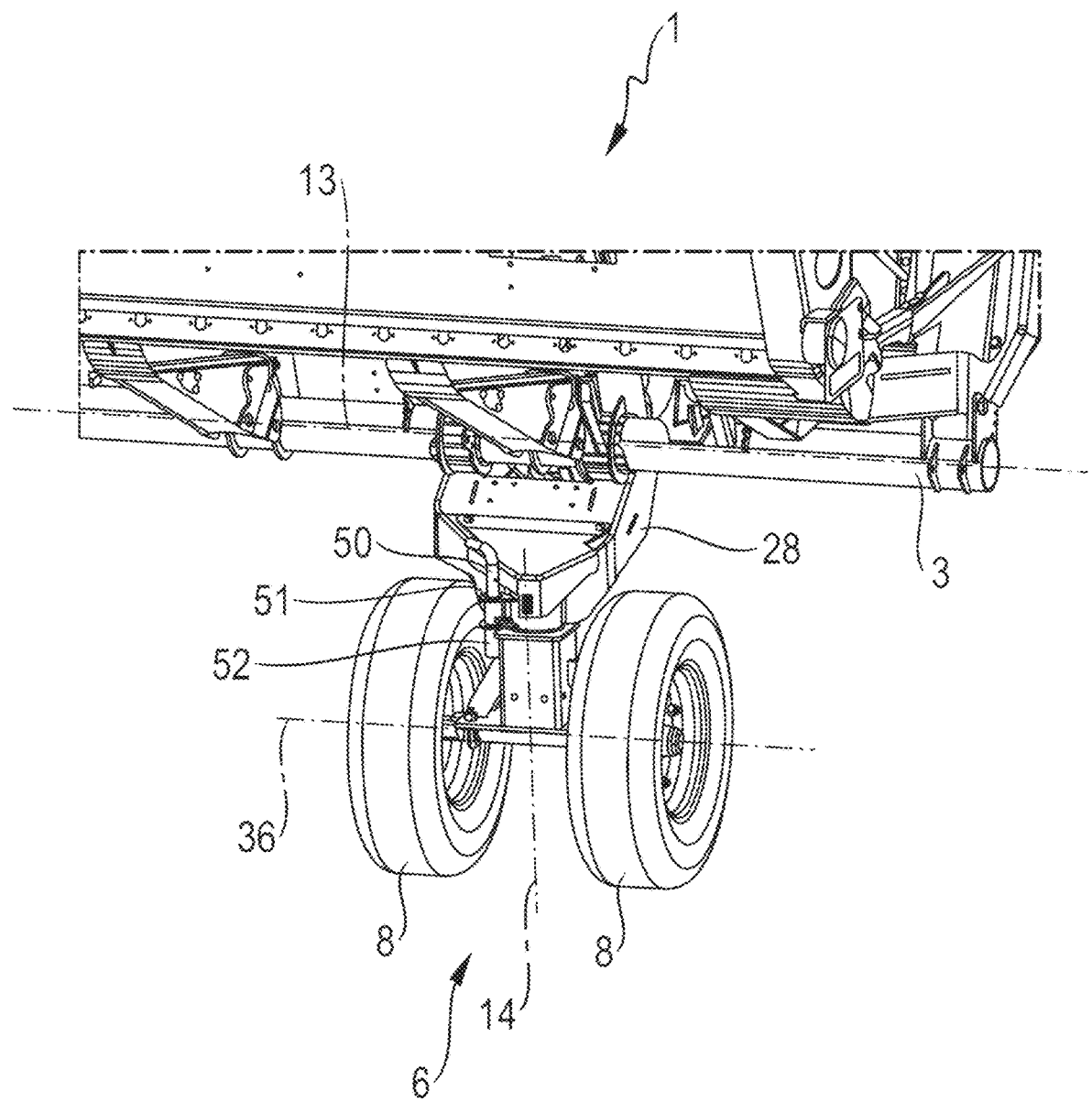
FIG. 14 illustrates a detail of the front suspension of the cutting unit according to FIG. 2, wherein the front suspension is in its intermediate position.

Subsequently, the rotation of the front suspension 6 about the rotary axis 14 relative to the transmission element 28 is blocked. To do this, both parts are connected to each other by means of the securing element 50, wherein the securing element 50 connects two seats 51, 52 that correspond to each other, of which one interacts with the transmission element 28 in a force-transmitting manner, and the other interacts with the front suspension 6 to form a keyed fit. This is shown in FIG. 14.

Figure 6:
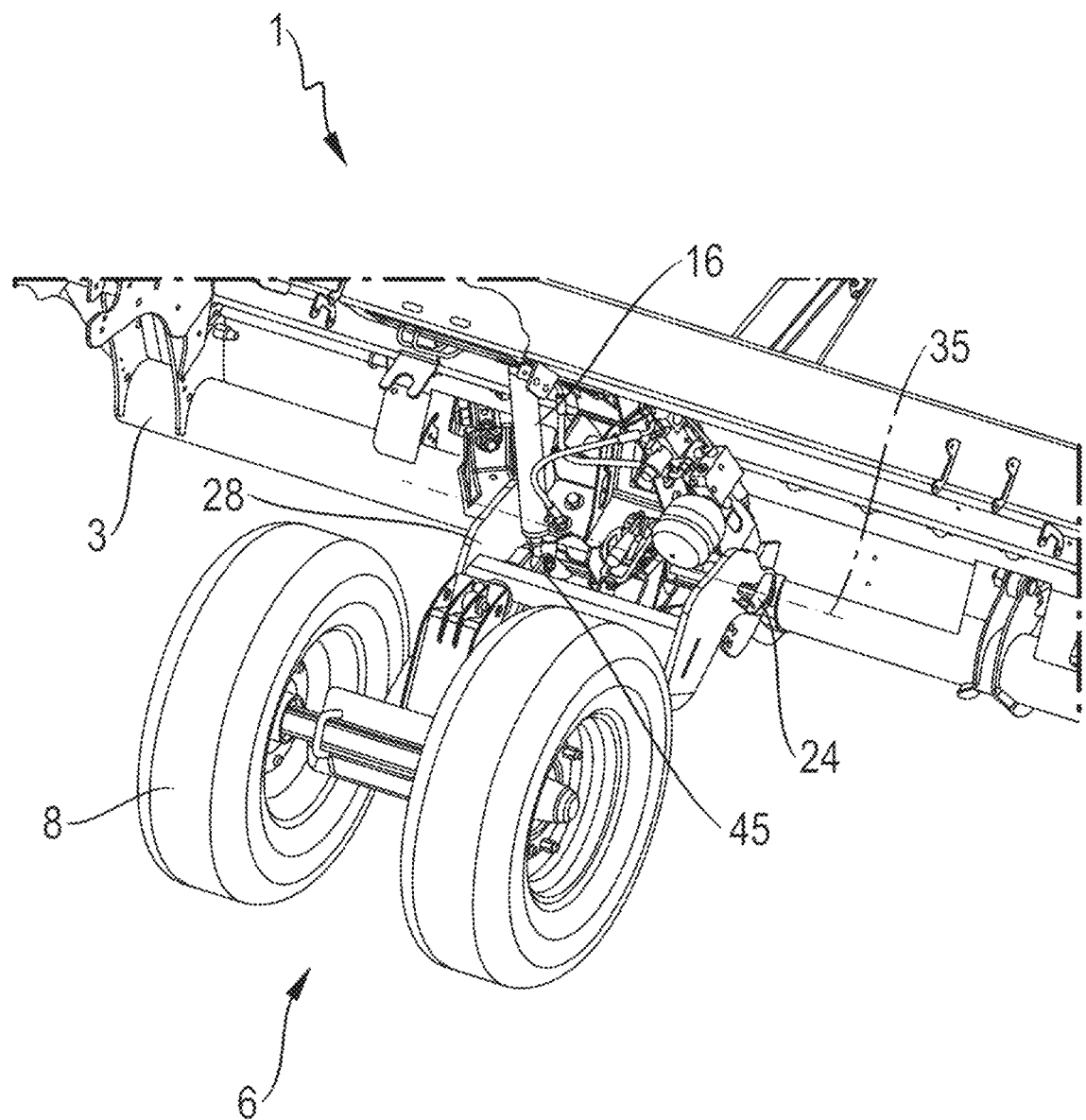
FIG. 6 illustrates the detail of the front suspension according to FIG. 3, wherein the front suspension is in its high position.

In this intermediate position, the transmission element 28 is furthermore connected to the support body 3 by a fixing element 23 so that the transmission element 28 and the front suspension 6 connected thereto cannot pivot about a pivot axle 35 relative to the support body 3. To allow the front suspension 6 to pivot, it is correspondingly first necessary to disconnect the fixing element 23, upon which the transmission element 28 can pivot about the pivot axle 35. The pivoting about the pivot axle 35 may be performed by adjusting device 16. In one implementation, a switch (not shown) is arranged or positioned on the cutting unit 1, and/or on a self-propelling agricultural working machine 2 that bears the cutting unit 1. By actuating the switch, the front suspension 6 can then be transferred or transitioned into a high position, which is illustrated in FIG. 6.

Figure 5:
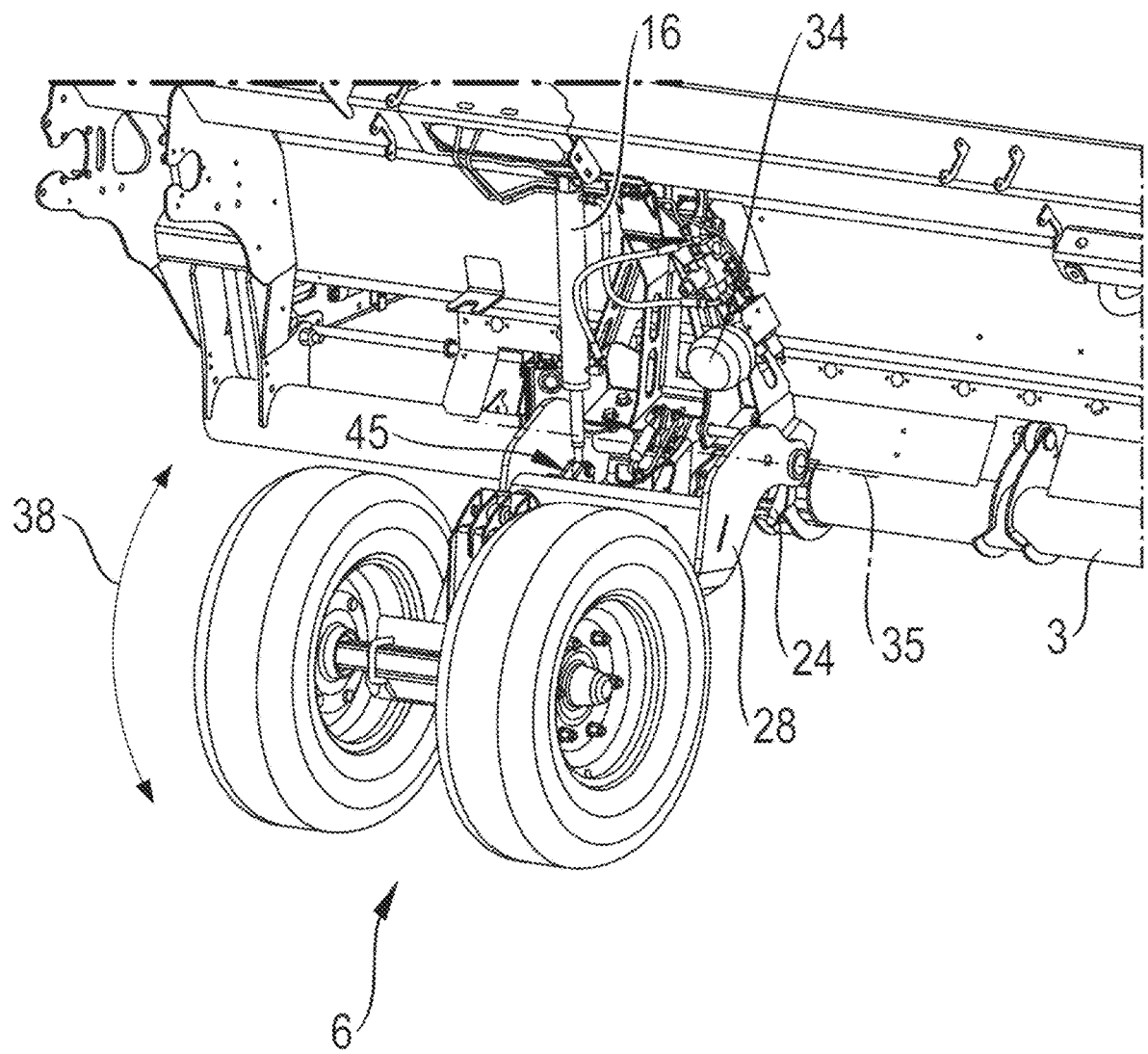
FIG. 5 illustrates the detail of the front suspension according to FIG. 3, wherein the front suspension is in its low position when in its working position.

The transmission element 28 can be pivoted about the pivot axle 35 relative to the support body 3. This pivotability is provided in this case in order to move the front suspension 6 between its high position and a low position when in its work position (FIGS. 5 and 6). When the front suspension 6 is in its transport position, pivoting about the pivot axle 35 may not be desired. To prevent pivoting about the pivot axle 35 when the front suspension 6 is in its transport position, the transmission element 28 is fixed in its position, as shown in FIG. 3 by using the fixing element 23. Rotating the front suspension 6 about the rotary axis 14 is contrastingly possible, at least within a given angular range, which may be necessary for the cutting unit 1 to be guided around curves while the cutting unit 1 is being transported.

In the shown example, the front suspension 6 interacts with the adjusting device 16, which may be formed by a piston/cylinder unit. The adjusting device 16 in turn interacts with a hydraulic system which inter alia comprises a hydraulic pump 34. Using hydraulic pump 34, it is possible to drive the adjusting device 16 such that a piston of the adjusting device 16 may be moved out of its cylinder or into the cylinder. In so doing, the adjusting device 16 is connected in a force-transmitting manner to the transmission element 28, wherein a contact point 45 of the adjusting device 16 with the transmission element 28 has a lever arm relative to the pivot axle 35. It is thereby possible to pivot the transmission element 28, and with it the front suspension 6, about the pivot axle 35 relative to the support body 3 by the effect of the adjusting device 16.

To secure a low position in which the front suspension 6 is lowered to the maximum, the cutting unit 1 in the shown example has a blocker 24, which may be designed in the form of a safety bolt. This blocker 24 can be fixedly arranged on the support body 3 and, when in the corresponding position, is located along the path of movement of at least part of the transmission element 28 such that the transmission element 28 finally collides with the blocker 24 when the front suspension 6 is lowered. The position of the front suspension 6 in which, upon being reached, the transmission element 28 contacts the blocker 24, is defined as the "low position". Between the high position and the low position, it is possible to guide the front suspension 6 into any intermediate position and hold it there using the adjusting device 16. A corresponding movement of the front suspension 6 is illustrated in FIG. 5 by the double arrow 38. In this manner, it is very easily possible to adjust a level in height at which the cutting unit 1 is to be positioned above the ground underneath 18. It is also very easily possible to adjust a working height of the cutting device 4. This allows the cutting unit 1 to be adjusted to different harvesting parameters, in particular responsive to detecting a respective ground condition by the control unit.

Figure 11:
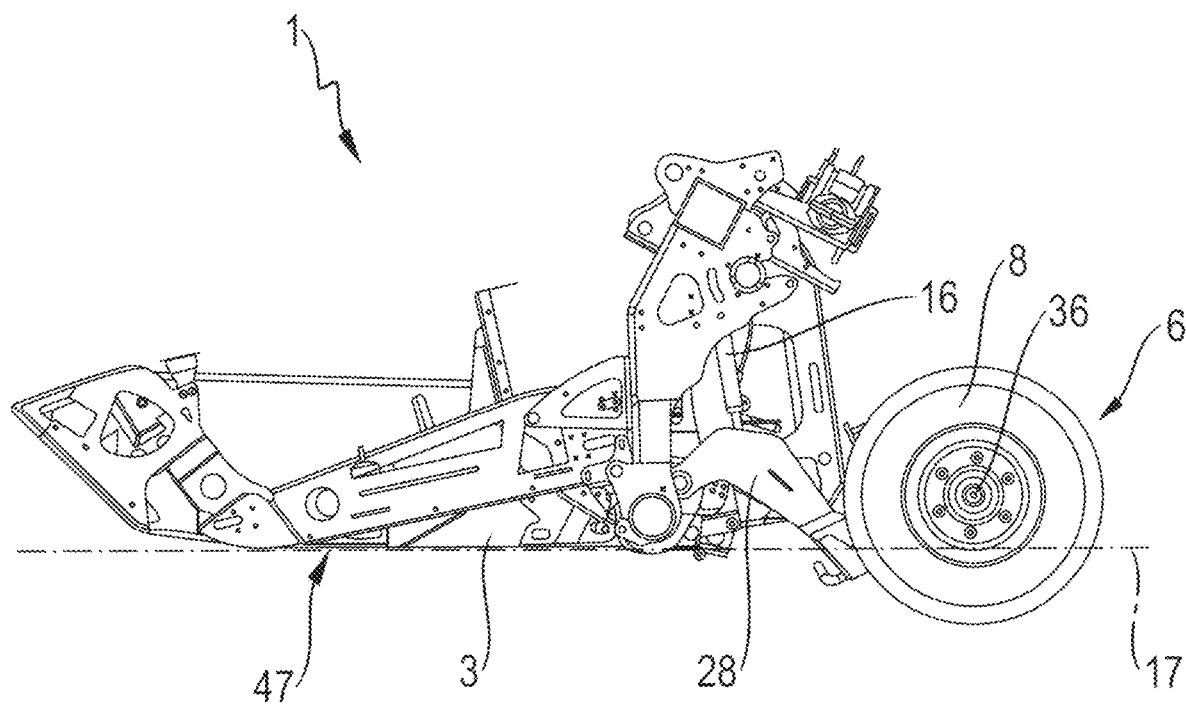
FIG. 11 illustrates a side view of the cutting unit according to FIG. 2, wherein the front suspension and the rear suspension are in their respective low positions when in their respective working positions.
Figure 12:
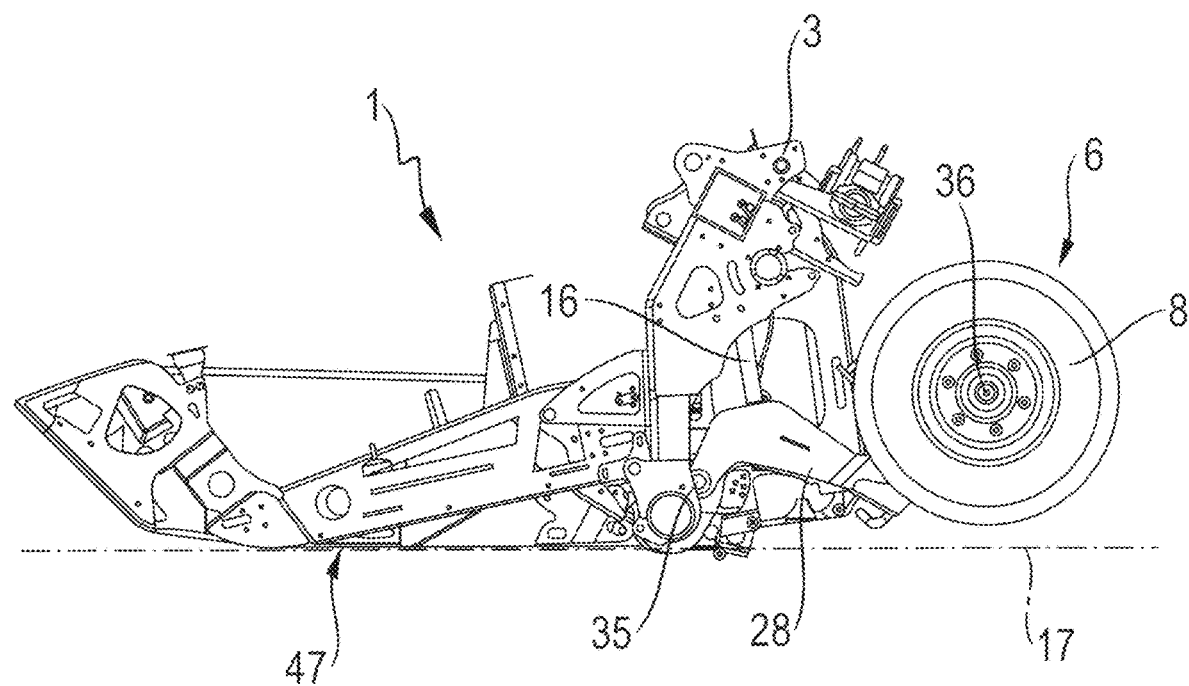
FIG. 12 illustrates the side view according to FIG. 11, wherein the front suspension and the rear suspension are in their respective high positions when in their respective working positions.

In the shown example, the high position of the front suspension 6 is adjusted so that the wheels 8 of the front suspension 6, when the latter is in its high position, are completely above a floor level 17 of the cutting unit 1. This is illustrated in FIG. 12. Because of the described arrangement, a bottom side 47 of the cutting unit 1 can be moved into direct contact with the ground underneath 18 without the wheels 8 having contact with the ground underneath 18. In this configuration, the cutting unit 1 can be guided into a minimum working height above the ground underneath 18, and the respective plants 5 are cut at a lowest possible position. When in the low position, the front suspension 6 is arranged such that its wheels 8 extend at least by part of its circumference below the floor level 17. This is illustrated in FIG. 11. When the cutting unit 1 is lowered, the wheels 8 of the front suspension 6 come into contact with the ground underneath 18 and support the cutting unit 1 above the ground underneath 18. There is then no more direct contact between the bottom side 47 of the cutting unit 1 and the ground underneath 18. A change in the working height of the cutting device 4 is possible to a sufficient extent for the wheels 8, 11, 12 of the front suspension 6 and the rear suspension 9, when in their low position, to extend below the floor level 17.

In the event that the cutting unit 1 is to be stored unused for a longer period, for example for long transportation on a trailer, the front suspension 6 can be transferred or transitioned into its high position in which it is mechanically fixed using the above-described blocker 24. The adjusting device 16 is then not used. In this case, the blocker 24 establishes a form-fit connection between the transmission element 28 and the support body 3 of the cutting unit 1. This corresponding design is illustrated in FIG. 6.

The rear suspension 9 which is illustrated in FIGS. 7 to 10 comprises a crossmember 40 that is connected to a transmission element 39 while forming a rotary axis 15. To do this, the rear suspension 9 also has a rotary shaft (not shown) that extends in the direction of the rotary axis 15, and about which the transmission element 39 of the rear suspension 9 is rotatably fastened. The latter is designed analogous to the transmission element 28 of the front suspension 6 and can be pivoted about a pivot axle 46 relative to the support body 3 of the cutting unit 1. The pivot axle 46 is aligned parallel to the longitudinal axis 13 of the cutting unit 1. The rotary axis 15 in this case is arranged vertically and centrally relative to the rear suspension 9 analogous to the rotary axis 14 of the front suspension 6. This yields the same advantages that were already presented above in conjunction with the front suspension 6. In particular, the rear suspension 9 can be transferred or transitioned between its transport position and its work position without a particular exertion of force. During this transfer, the rear axle 25 of the rear suspension 9 about which the wheels 11, 12 rotate moves within an at least substantially horizontal plane.

Figure 7:
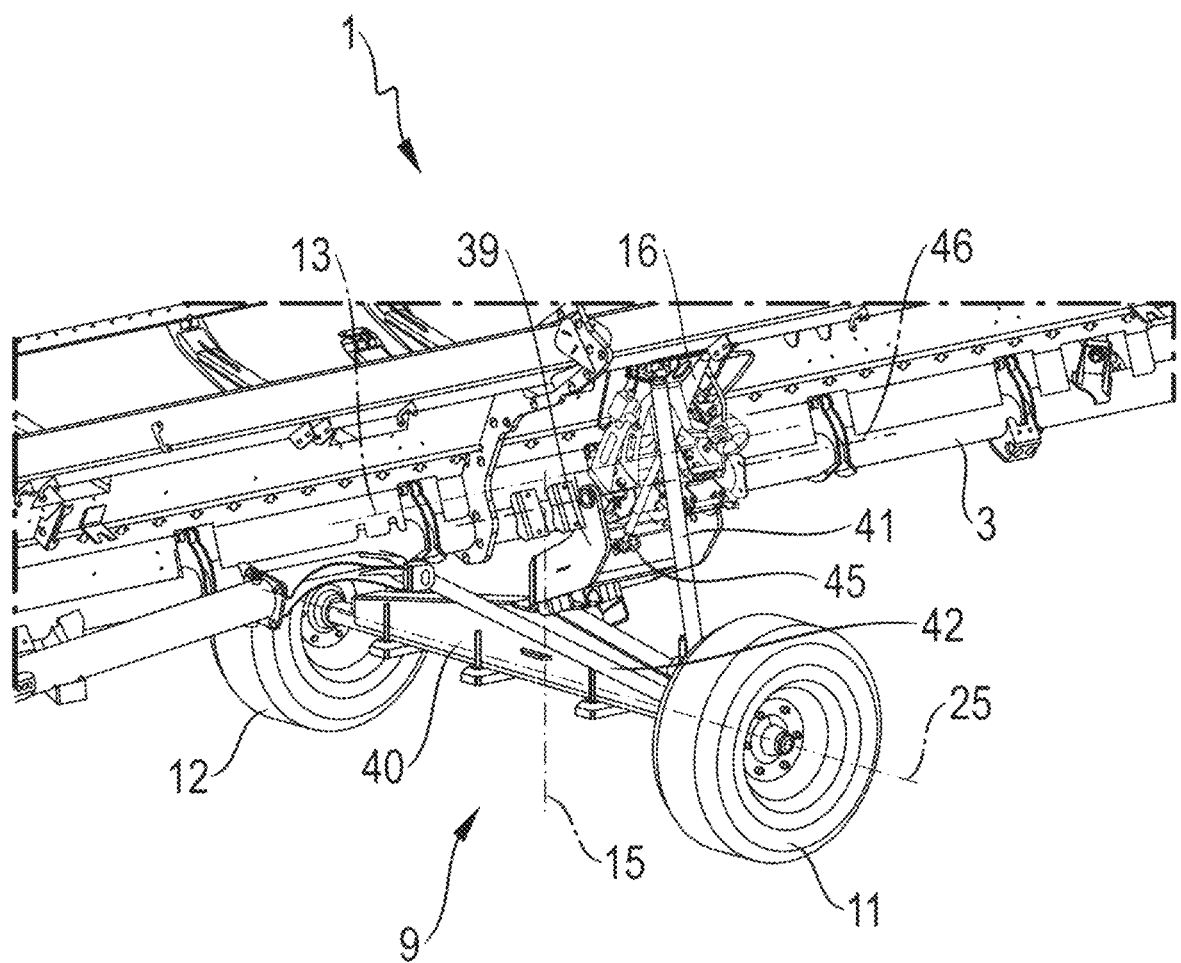
FIG. 7 illustrates a detail of a rear suspension of the cutting unit according to FIG. 2, wherein the rear suspension is in its transport position.

The wheels 11, 12 of the rear suspension 9 are arranged on the two mutually opposing ends of the crossmember 40. These are designed to be rotatable about the common rear axle 25 so that the cutting unit 1 can be driven on the wheels 11, 12. When in its transport position, the rear suspension 9 is arranged transverse to the longitudinal axis 13 of the cutting unit 1, as illustrated in FIG. 7. To fix and absorb torque acting on the rear suspension 9, the suspension is connected by fixing element 41, 42 to the support body 3 in a force-transmitting manner. Various fixing elements 41, 42 are contemplated. As one example, the fixing elements 41, 42 are designed in the form of elongated rods which, in terms of statics, form a tripod together with the crossmember 40, by which the rear suspension 9 can be fixed in its transport position.

Figure 8:
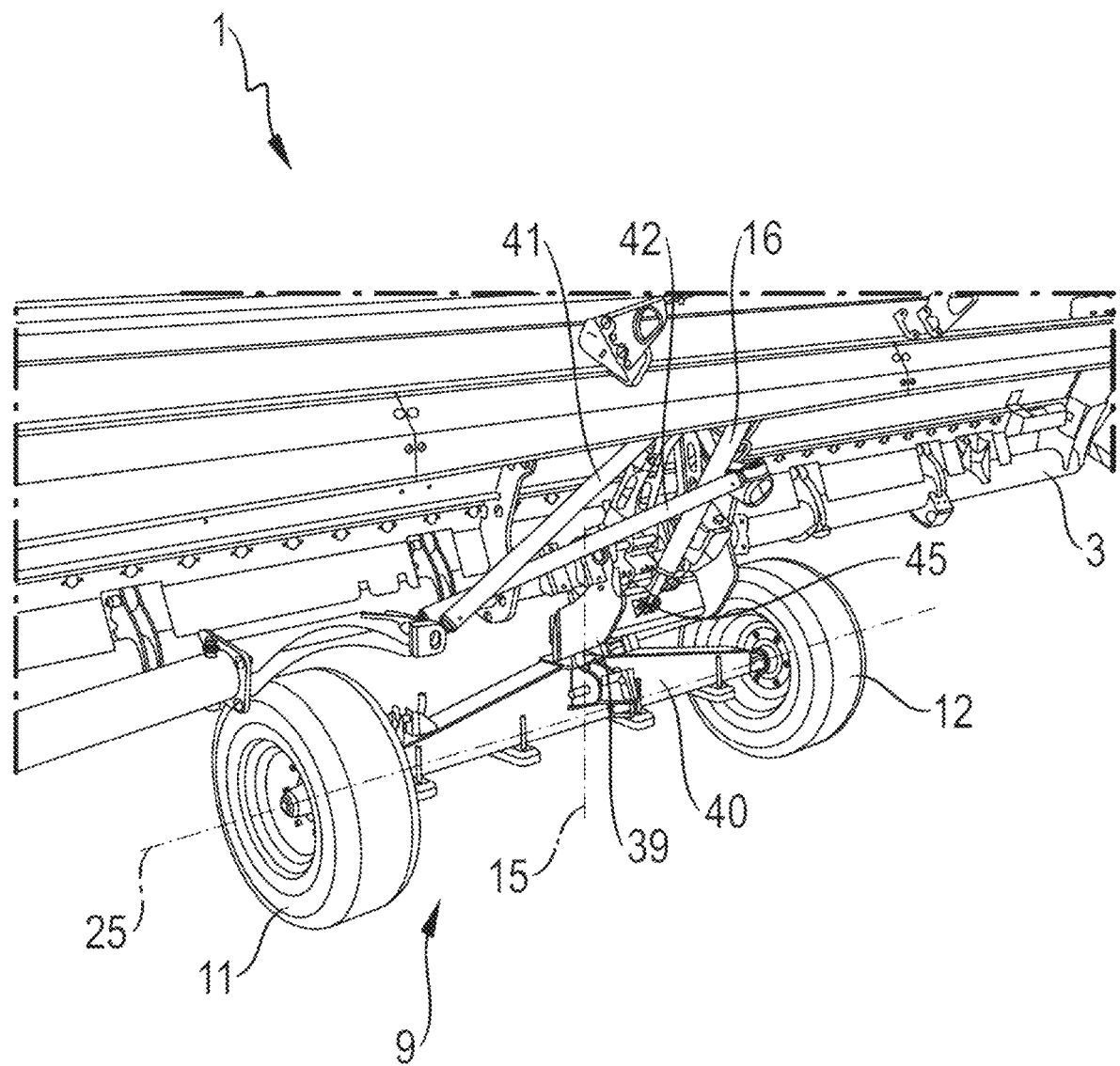
FIG. 8 illustrates the detail of the rear suspension according to FIG. 7, wherein the rear suspension is in an intermediate position.
Figure 9:
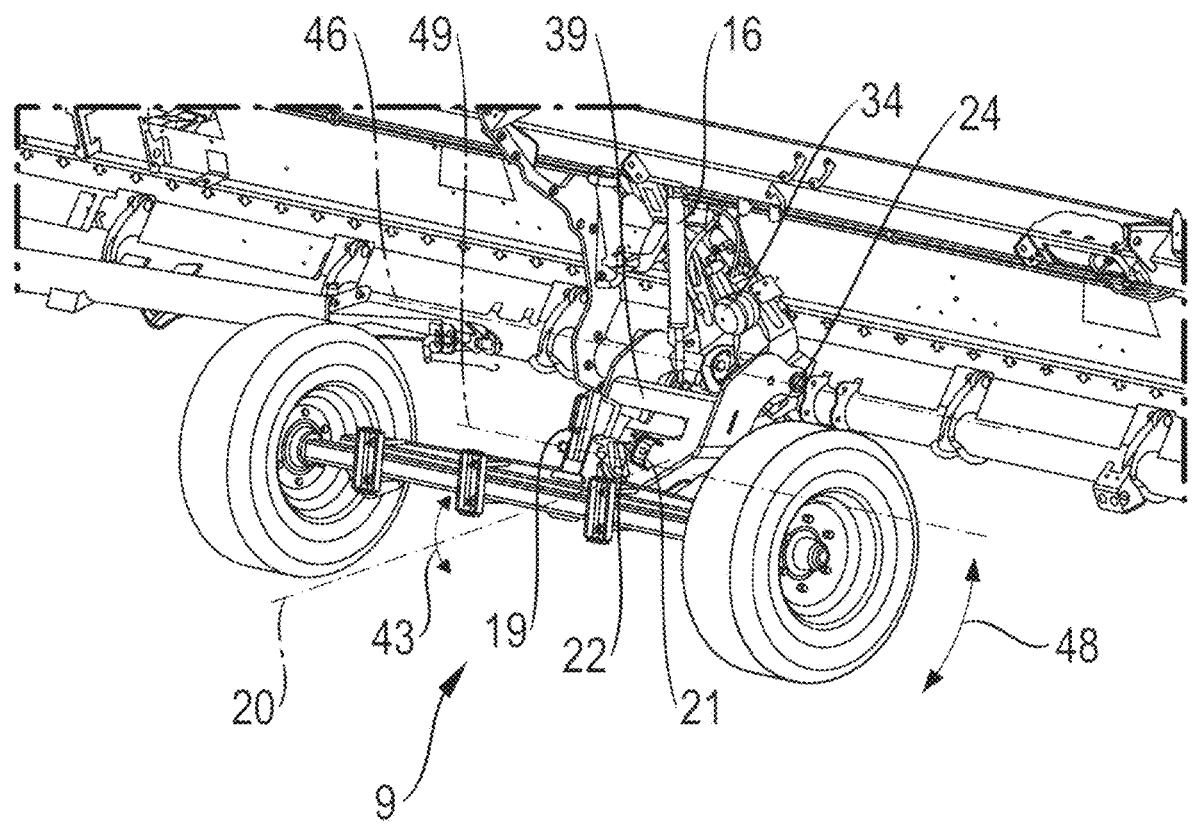
FIG. 9 illustrates the detail of the rear suspension according to FIG. 7, wherein the rear suspension is in its low position when in its working position.
Figure 10:
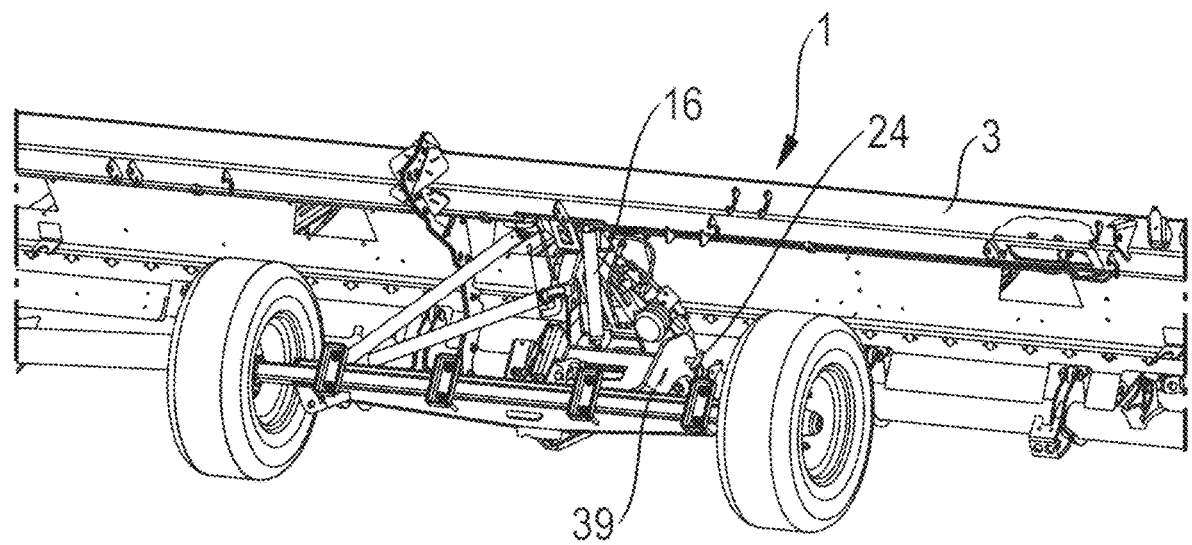
FIG. 10 illustrates the detail of the rear suspension according to FIG. 7, wherein the rear suspension is in its high position when in its working position.

To transfer the rear suspension 9 into its working position starting from its transport position, the rear suspension 9 is rotated relative to the transmission element 39 as well as the support body 3 by 90° about the rotary axis 15 that is configured vertically in this case so that the two wheels 11, 12 of the rear suspension 9 are arranged next to each other viewed in the longitudinal direction of the cutting unit 1. To do this, first the two fixing elements 41, 42 are manually disconnected and mounted on the support body 3 in a nonfunctional resting position. For the sake of clarity, this is not shown in FIG. 9, but is illustrated in FIGS. 8 and 10. After the fixing elements 41, 42 is disconnected, the rear suspension 9 can then be transferred or transitioned from the transport position into the working position by pivoting or rotating about the rotary axis 15. After the same is reached, the rear axle 25 is oriented parallel to the longitudinal axis 13 of the cutting unit 1.

The rear suspension 9 is now pivotable around a pivot axle 46 in an intermediate position with respect to pivotability of the transmission element 39. This intermediate position is illustrated in FIG. 8.

In order to enable the rear suspension 9 to pivot, the transmission element 39 can pivot about a pivot axle 46 analogous to the transmission element 28 on the front suspension 6. The pivoting about the pivot axle 46 may be performed using an adjusting device 16. Preferably, the same switch (not shown) is arranged on the cutting unit 1, and/or on a self-propelling agricultural working machine 2 that bears the cutting unit 1. By actuating the switch, the rear suspension 9 may also be transferred or transitioned into a high position at the same time as the front suspension 6. This is shown in FIG. 10. The transmission element 39 can be pivoted about the pivot axle 46 relative to the support body 3. This pivotability is provided in this case in order to move the rear suspension 9 between its high position and a low position when in its work position (FIGS. 9 and 10) in a particularly advantageous manner. When the rear suspension 9 is in its transport position, pivoting about the pivot axle 46 is contrastingly undesirable as is the case with the front suspension 6.

Analogous to the above description associated with the front suspension 6, the transmission element 39 of the rear suspension 9 works together with a blocker 24 that limits movement of the transmission element 39 downward relative to the pivot axle 46 and thereby defines the low position of the rear suspension 9. In this case, it is possible to transfer the rear suspension 9 between the aforementioned positions, as well as to any intermediate position (such as a plurality of discrete and definable intermediate positions), using adjusting device 16 that is assigned to the rear suspension 9 and is formed from a piston/cylinder unit comparable with the adjusting device 16 of the front suspension 6. The latter also interacts with a hydraulic system, which includes a hydraulic pump 34. By articulating the adjusting device 16 to a contact point 45 while forming a lever arm relative to the pivot axle 46, it is also possible to pivot the transmission element 39 relative to the support body 3 of the cutting unit 1 and thereby move the rear suspension 9 corresponding to a double arrow 48 shown in FIG. 9. In the event that the cutting unit 1 is to be set down and remain unused for at least a certain period of time, the rear suspension 9 can be transferred or transitioned to its high position and then be fixed in this high position by way of the blocker 24. The adjusting device 16 is then unused. A corresponding configuration is illustrated in FIG. 10.

The adjusting device 16 may be at least indirectly connected in a data transmitting manner to (e.g., in one-way or bidirectional communication with) the input device 27 of the agricultural working machine 2. In this manner, the operator may input a command via the input device 27 to thereby control the adjusting device 16. Thus, the operator may use entry via the input device 27 to cause the front suspension 6 and the rear suspension 9 to directly move. In one implementation, the adjusting device 16 of the front suspension 6 and rear suspension 9 are coupled to each other such that they always cause an equivalent movement of the front suspension 6 and the rear suspension 9.

Figure 13:
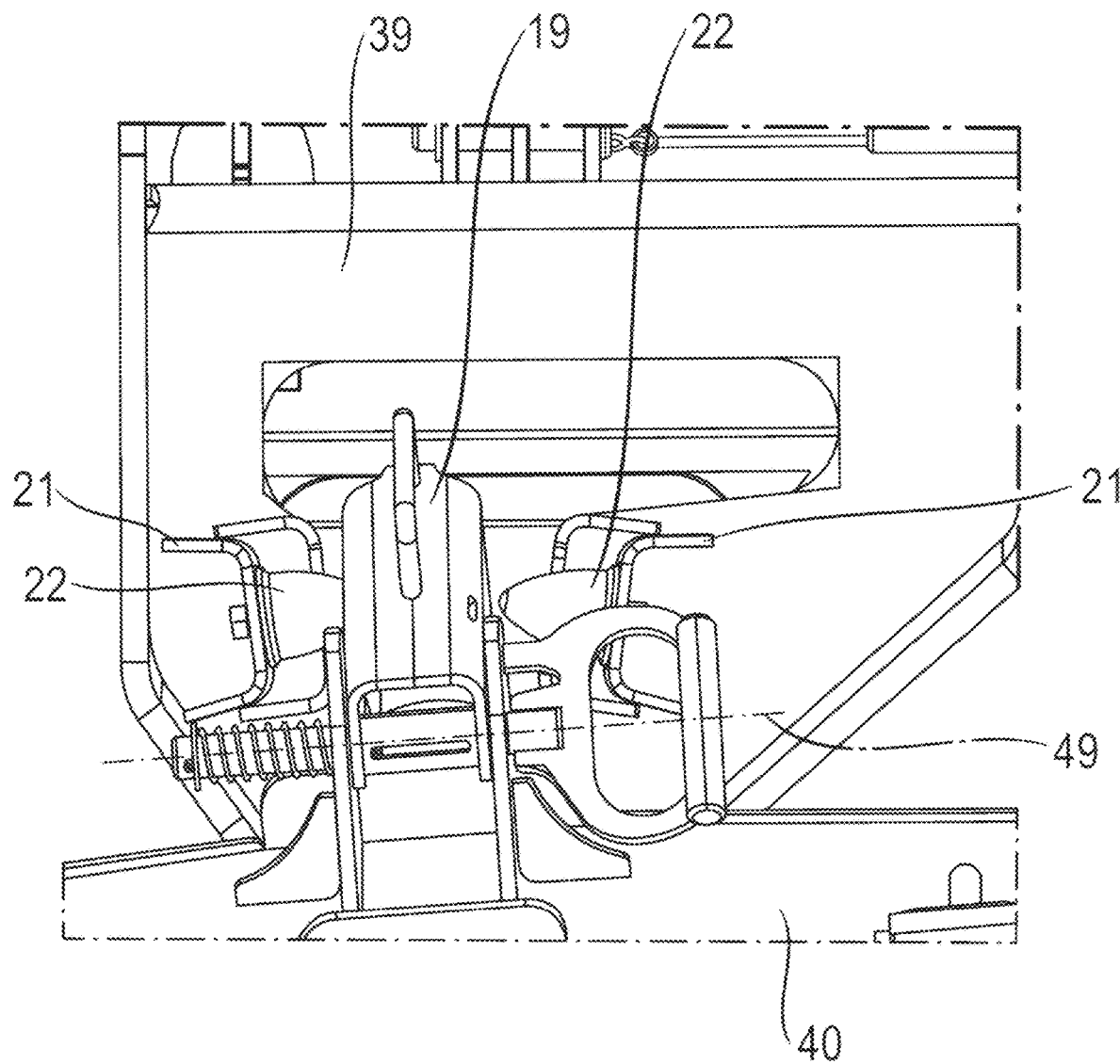
FIG. 13 illustrates a detail of a pendulum suspension of the rear suspension.

Due to the much greater distance between the wheels 11, 12 of the rear suspension 9 in comparison to the front suspension 6, it is particularly advantageous to enable an oscillating rotary movement of the rear suspension 9 about an axis of oscillation 20. In this manner, the rear suspension 9 can absorb unevenness in the ground below 18 and not directly transmit it to the cutting unit 1. The oscillating rotary movement about the axis of oscillation 20 that is formed between the rear suspension 9 and the transmission element 39 is illustrated in FIG. 9 by the double arrow 43 therein. To prevent a collision of the wheels 11, 12 with the support body 3 of the cutting unit 1 during an oscillating rotary movement of the rear suspension 9, the rear suspension 9 is equipped with limiter 19. This is suitable for interacting with corresponding stopper 21 that are arranged on the transmission element 39. The limiter 19, which in one implementation has a wedge shape, is rotatably arranged about a rotary axis 49 on the rear suspension 9 so that it can be transferred or transitioned between a passive position and an active position. In one or some implementations, the cutting unit 1 can only be operated in the active position. When the rear suspension 9 is in its working position, the limiter 19 can be thereby transferred or transitioned very easily starting from its passive position, in which it is ineffective, into its active position, in which the limiter 19 is inserted into a region between the stopper 21 of the transmission element 39. A corresponding state is illustrated in FIG. 13, whereas the limiter 19 is still in its passive position in FIGS. 9 and 10. In FIG. 13, the rotary axis 49 is illustrated, about which the limiter 19 can move relative to the rear suspension 9. The stopper 21 are arranged such that they release a certain oscillating rotation angle of the rear suspension 9 about the axis of oscillation 20; however, the stopper 21 block any oscillating rotary movement beyond that. The released oscillating rotation angle in this case is about ±8° (e.g., less than ±10°). To dampen an impact of the limiter 19 against the stopper 21, the latter in this case may always have a damper 22, which may be formed by an elastomer. The limiter 19 can be fixed by way of a fixing element in its active position.

In order to make the cutting unit 1 suitable for use in public road traffic, the cutting unit 1 has two yellow flashing lights 30 on a front side that are each arranged on the left and right relative to the front side. The flashing lights 30 are in particular suitable for displaying a turning process or an emergency situation by flashing individually or simultaneously. Furthermore, the cutting unit 1 has reflector strips 44 that are kept yellow on the front side. The described design of the front side of the cutting unit 1 is illustrated in FIG. 2.

Finally, the cutting unit 1 has a warning sign 32 on its rear side which in this case is designed in the form of a yellow triangle with a red edge. The warning sign 32 is designed with retroreflective properties. Moreover, the cutting unit 1 also has two lateral, yellow flashing lights 30 on its rear side, as well as brake lights assigned to these flashing lights 30 which are kept red. These brake lights are not shown in the figures. Reflector strips 44 arranged below the flashing lights 30 are also available which are also kept red on the rear side. The rear side of the cutting unit equipped in this manner is also illustrated in FIG. 2.

The cutting unit may be operated in a transport position in road traffic, and may also be operated in a working position in field mode and in the high position in which its wheels do not have any ground contact, as well as in the low position in which its wheels have ground contact.

LIST OF REFERENCE NUMBERS

1 Cutting unit
2 Working machine

3 Support body
4 Cutting device
5 Plant
6 Front suspension
7 First half
8 Wheel
9 Rear suspension
10 Second half
11 Wheel
12 Wheel
13 Longitudinal axis
14 Rotary axis
15 Rotary axis
16 Adjusting device
17 Floor level
18 Ground underneath
19 Limiter
20 Axis of oscillation
21 Stopper
22 Damper
23 Fixing element
24 Blocker
25 Rear axle
26 Driver's cab
27 Input device
28 Transmission element
29 Inclined conveyor
30 Flashing light
31 Tow bar
32 Warning sign
33 Opening cross-section
34 Hydraulic pump
35 Pivot axle
36 Front axle
37 Double arrow
38 Double arrow
39 Transmission element
40 Cross member
41 Fixing element
42 Fixing element
43 Double arrow
44 Reflector strip
45 Contact points
46 Pivot axle
47 Bottom side
48 Double arrow
49 Rotary axis
50 Securing element
51 Seat
52 Seat
60 Control unit
62 Processor
64 Memory

The invention claimed is:

1. A cutting unit for an agricultural working machine, the cutting unit comprising:
 a support body;
 at least one elongated cutting device arranged on the support body through which plants are harvested;
 a front suspension arranged on the support body and assigned to a first portion of the cutting unit, the front suspension including at least one wheel configured to rotate about a front axle;
 a rear suspension arranged on the support body and assigned to a second portion of the cutting unit, the rear suspension including at least two wheels configured to rotate about a rear axle;
 wherein both the front suspension and the rear suspension are configured to be rotatable about a respective rotary axis relative to the support body so that the front suspension and the rear suspension are configured for transition between a transport position and a working position;
 wherein the front suspension and the rear suspension, when in their respective transport position, are aligned transverse to a longitudinal axis of the cutting unit, and when in their respective working position, are aligned parallel to the longitudinal axis of the cutting unit; and
 wherein the front suspension and the rear suspension, when in their respective working position, are configured to move between at least a high position and at least a low position relative to the support body using at least one adjusting device.

2. The cutting unit of claim 1, wherein the first portion comprises a first half of the cutting unit;
 wherein the second portion comprises a second half of the cutting unit; and
 wherein the at least one wheel of the front suspension and the at least two wheels of the rear suspension are arranged entirely above a floor level of the cutting unit when the front suspension and rear suspension are positioned in their respective high position so that the cutting unit is configured for storage without any of the at least one wheel of the front suspension and the at least two wheels of the rear suspension bearing load of the cutting unit.

3. The cutting unit of claim 1, wherein the at least one wheel of the front suspension and the at least two wheels of the rear suspension at least partially extend below a floor level of the cutting unit when the front suspension and rear suspension are in their respective low position so that the support body of the cutting unit, when the cutting unit is placed on ground, is supported by the at least one wheel of the front suspension and the at least two wheels of the rear suspension.

4. The cutting unit of claim 1, wherein each of the front suspension and the rear suspension have a respective adjusting device assigned to them.

5. The cutting unit of claim 1, wherein one or both of the front suspension or the rear suspension interact with a transmission element; and
 wherein the transmission element is rotatably arranged about a rotary axis on the support body so that the one or both of the front suspension or the rear suspension, when in their respective working position, are configured to move between the high position and the low position by rotating the transmission element.

6. The cutting unit of claim 1, wherein the at least one adjusting device is configured to interact with a hydraulic system that is formed by a hydraulic cylinder.

7. The cutting unit of claim 1, wherein the rear suspension includes a limiter through which, when the rear suspension is in its working position, an oscillating rotary movement of the rear suspension relative to the support body is limited about an axis of oscillation within an oscillation range to either side of a zero position of the rear suspension.

8. The cutting unit of claim 7, wherein at least one stopper is arranged on the support body such that, when the limiter is in its active position, corresponds therewith such that the limiter strikes the stopper when a maximum pendulum swing of the rear suspension is reached so that a further oscillating rotary movement of the rear suspension is prevented.

9. The cutting unit of claim 8, wherein one or both of the limiter or the stopper interact with at least one damper such that striking of the limiter against the stopper is dampened.

10. The cutting unit of claim 1, further comprising at least one blocker; and
    wherein the at least one blocker is configured, at least when one or both of the front suspension or the rear suspension is temporarily connected in a form fit with the support body, to block movement of the front suspension or the rear suspension relative to the support body, when the one or both of the front suspension or the rear suspension are in its high position.

11. The cutting unit of claim 10, wherein a lowering of the one or both of the front suspension or the rear suspension to their respective low position, is limited by the blocker upon striking the blocker.

12. The cutting unit of claim 1, wherein a respective rotary axis for rotating the front suspension and a respective rotary axis for rotating the rear suspension are configured vertically and in a middle of the front suspension and in a middle of the rear suspension, respectively, in order to transfer between the respective transport position and the respective working position; and
    wherein the front suspension and the rear suspension are configured to transition between the respective transport position and the respective working position only by rotating about the respective rotary axis for the front suspension and the respective rotary axis for the rear suspension.

13. The cutting unit of claim 12, wherein the respective rotary axis for the front suspension and the respective rotary axis for the rear suspension are oriented orthogonal to a longitudinal axis of the cutting unit.

14. The cutting unit of claim 1, further comprising a communication interface configured to communicate with the agricultural working machine; and
    wherein the at least one adjusting device is configured to communicate, via the communication interface, in order to transmit data to an input device positioned in a driver's cab of the agricultural working machine such that, responsive to receiving a command via the communication interface from the input device, the at least one adjusting device is configured to move the front suspension into its working position and to move the rear suspension into its working position.

15. A method for adjusting a cutting unit of an agricultural working machine, the method comprising:

moving, using at least one adjusting device, one or both of a front suspension and a rear suspension between a high position and a low position relative to a support body of the cutting unit, wherein when in their respective working position, the front suspension and the rear suspension are aligned parallel to a longitudinal axis of the cutting unit; and rotating, only about a respective vertical rotary axis, one or both of the front suspension and the rear suspension to transition between a transport position and the working position, the respective vertical rotary axis positioned in a middle of the front suspension or in a middle of the rear suspension relative to a support body of the cutting unit.

16. The method of claim 15, further comprising receiving a command from an input device of a driver's cab of the agricultural working machine; and
    responsive to receiving the command, moving the front suspension and the rear suspension according to the command.

17. The method of claim 15, wherein the front suspension and the rear suspension are rotated about their respective rotary axes relative to the support body.

18. The method of claim 17, wherein a front axle assigned to the front suspension or a rear axle assigned to the rear suspension is rotated within a horizontal plane while at least one of the front suspension or the rear suspension is rotating about their respective rotary axis.

19. The method of claim 18, wherein at least one of the front suspension or the rear suspension are rotated by an angular dimension of 90° about their respective rotary axis while transitioning between the transport position and the working position.

20. The method of claim 19, wherein one or both of the front suspension or the rear suspension are fixed in their respective working position using at least one securing element in order to block unintentional rotation of the front suspension or the rear suspension about their respective rotary axis.

21. The method of claim 15, wherein the at least one adjusting device moves both of the front suspension and the rear suspension between the high position and the low position relative to the support body of the cutting unit; and
    wherein rotating only about the respective vertical rotary axis is in both of the front suspension and the rear suspension.

* * * * *